March 20, 1956 A. W. McDONALD 2,738,987
TRAILER STEP
Filed May 29, 1953
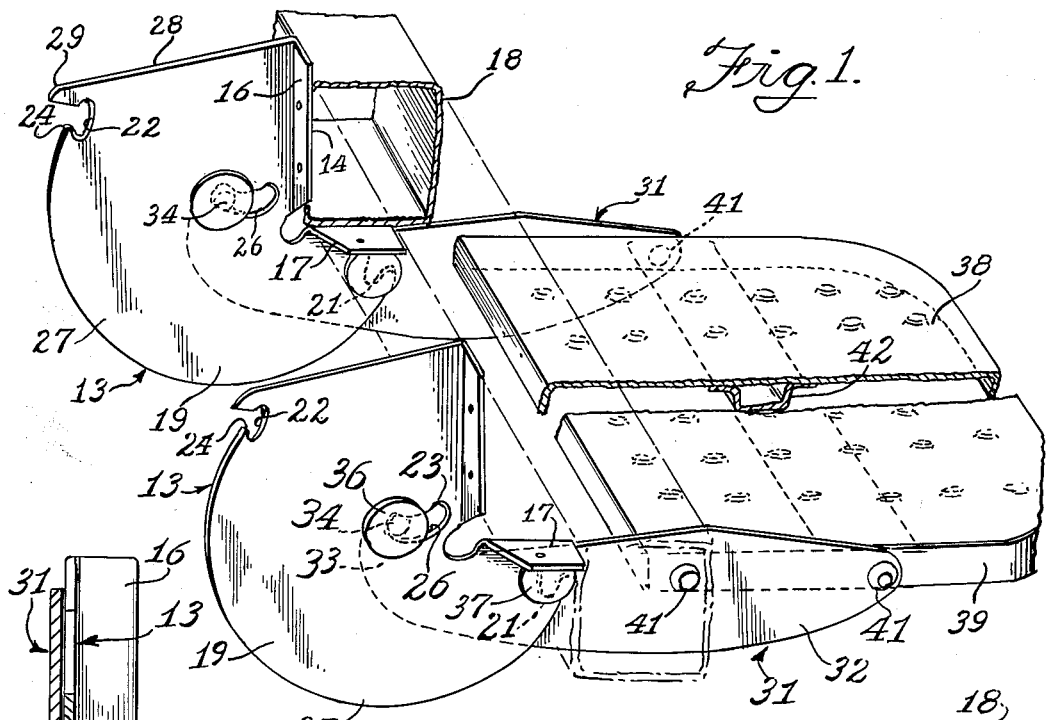
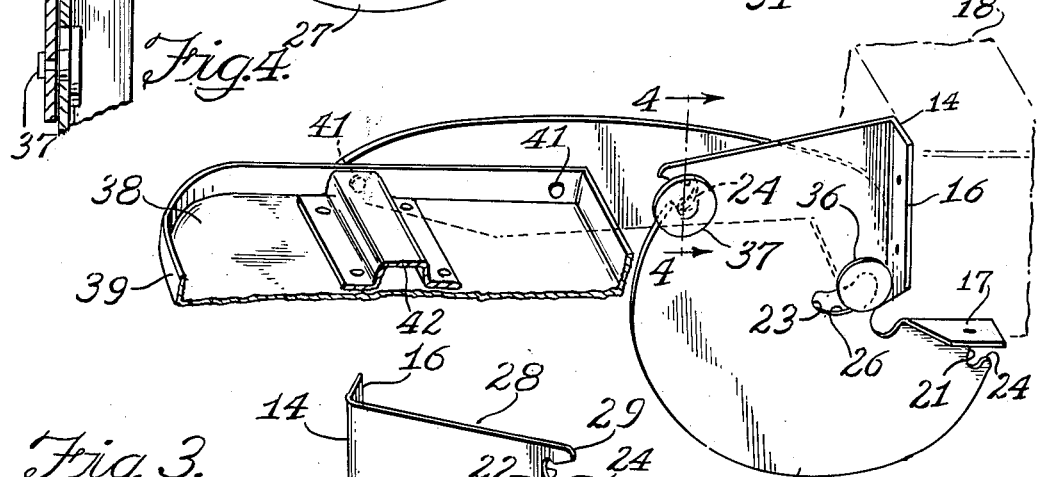
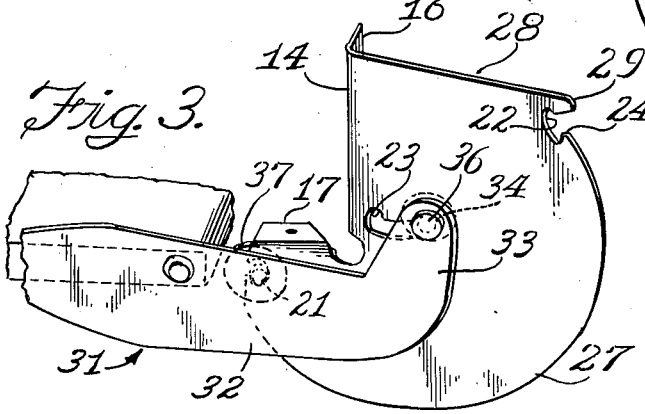
INVENTOR.
Albert W. McDonald
BY Nathan N. Kravs &
Frank H. Marks
Attorney 400; # United States Patent Office 2,738,987
Patented Mar. 20, 1956

2,738,987

TRAILER STEP

Albert W. McDonald, St. Petersburg, Fla.

Application May 29, 1953, Serial No. 358,488

2 Claims. (Cl. 280—166)

My invention relates to a novel foldable step particularly adapted for use on automobile trailer vehicles but of course suitable for other applications wherever the features of such a step may be desirable.

One of the objects of my invention is the provision of a trailer step which may be quickly and easily positioned for use and collapsed and folded under the trailer when not in use.

Another object of my invention is the provision of a trailer step which is substantially locked in in-use or out-of-use position against inadvertent displacement.

Another object of my invention is the provision of a trailer step which is sturdy, durable and efficient in service and economical to manufacture.

A further object of my invention is the provision of a trailer step utilizing identical supporting brackets whereby a minimum of tooling is required in the fabrication thereof.

Other and further objects and advantages of my invention will become apparent from the following description when considered in connection with the accompanying drawings in which:

Fig. 1 is a perspective view of a foldable step in accordance with my invention.

Fig. 2 is a fragmentary perspective view showing the step in an out-of-use position.

Fig. 3 is a fragmentary perspective view looking in a direction opposite from that of Fig. 1, and Fig. 4 is a cross sectional view taken substantially on line 4—4 of Fig. 2.

Referring to the drawings, my invention comprises a pair of identical brackets 13 shaped substantially as illustrated in Fig. 1, the said brackets being formed preferably of sheet metal in the shape illustrated and each having a right angle cut-out 14 defined by flanges 16 and 17, the said flanges being perforated to receive suitable fastening means such as bolts or rivets by which the brackets may be attached to a vehicle body member 18 as illustrated in Fig. 1. The brackets are identical in construction, both being fabricated by the same tools thereby avoiding the necessity of providing brackets in opposed paired relationship formed with two sets of tools.

Each of the brackets is formed with a substantially circular segment portion 19 and arranged substantially on the chordal line thereof are front and rear ovalized slots 21 and 22 respectively, and an elongated aperture 23 intermediate said slots. The slots 21 and 22 communicate with the edge of the segment portion through restricted necks 24. The aperture 23 is shaped substantially as illustrated in Figs. 1–3 with the lower edge 26 thereof being substantially concentric with the arcuate edge 27 of the segment portion 19. The upper edge 28 of the bracket is angled or inclined for purposes of clearance and has a portion 29 extending beyond the arcuate edge 27 to provide a stop for the step supporting arms, as will be hereinafter explained.

A pair of step supporting arms 31 are provided, each having an elongated body portion 32 and an integral upwardly extending ear 33. The arms 31 are pivotally connected to the brackets 13 by means of studs 34 provided with enlarged circular heads 36 which overlap the marginal edges of the apertures 23 to afford securement against lateral sway. It will be understood that as an alternative construction it is within the contemplation of my invention to provide apertures such as 23 in the arms 31 and mount studs such as 34 on the brackets 13. As will be apparent by reference to Fig. 1, both arms 31 are similarly positioned relative the brackets 13, each arm lying adjacent the bracket side opposite the side from which the flanges 16 and 17 extend. A similar stud 37 is secured to each of the side arms 31, the said studs being adapted to engage in either of the slots 21 or 22 to secure the step in in-use or out-of-use positions. When the arms 31 are moved from the position illustrated in Fig. 1 to the position illustrated in Fig. 2, the enlarged heads of the studs 37 engage with the marginal edges of the bracket portions 19. The heads of the said studs further afford means for retaining the arms against the brackets and minimize lateral sway of the step.

A metal tread 38 provided with downturned flanges 39 is secured as by rivets 41 which pass through the arms 31 and through the flanges 39 at the side of the tread. A U-shaped channel iron 42 provided with outturned flanges is welded to the underside of the tread as shown more clearly in Fig. 2 and affords reinforcement to the tread for rigidifying the same.

When in operative position the parts are in the relation illustrated in Fig. 1 with the studs 37 received in the slots 21 of the brackets and the tread 38 supported in a horizontal position. As will be apparent, the step structure is adapted to fulcrum on the studs 37 and because of the particular shape of the slots 21 and 22 and the unbalanced weight of the step structure, the weight of the step structure is itself sufficient to retain the studs 37 within the lower portions of the said slots thereby to insure against inadvertent dislodgement of the step structure. It will also be apparent that if the edge of the tread for example were accidentally engaged by a foot so as to tip the same upwardly, the studs 37 would enter the upper portions of the slots 21 and 22 which are shaped correspondingly like the lower portion and again dislodgement of the step structure would be averted. In order to swing the step structure from in-use to out-of-use position, the tread 38 is pulled out horizontally a short distance to the right as viewed in Fig. 1 so that the studs 37 pass through the necks of the slots 21 clear of the brackets and the step structure is then swung 180 degrees about the studs 36 which now act as pivotal supports until the tread and arms assume the position illustrated in Fig. 2. In this position the tread 38 is disposed horizontally but in a somewhat higher plane than when in the in-use position illustrated in Fig. 1. In the out-of-use position the step structure similarly as in the first instance is retained against inadvertent dislodgement until it is intentionally moved to another position. The extension 29 on the bracket serves as a stop means to limit the movement of the step structure so that it is not caused to strike against the under portion of the frame of the trailer.

Various changes coming within the spirit of my invention may suggest themselves to those skilled in the art. Hence, I do not wish to be limited to the specific embodiments shown and described or uses mentioned, but intend the same to be merely exemplary, the scope of my invention being limited only by the appended claims.

I claim:

1. A vehicle step comprising a pair of spaced sheet metal brackets each having a substantially right angle recess in a forward edge thereof, there being vertical and horizontal lateral flanges integral with the respective marginal edges of said recesses, the said flanges being arranged to be secured to corresponding surfaces on the underside of said vehicle, each of said brackets including a substantially circular segment portion, each of said brackets having a first slot in a forward edge of each segment portion substantially immediately below the horizontal flange, each of said brackets having a second slot in a rear edge of said segment portion, said second slots being at an elevation higher than said first slots, each of said brackets having an arcuate aperture substantially medially of said forward and rearward slots, said slots and said aperture being aligned substantially on a chordal line of said circular segment portion, said aperture having at least one edge substantially concentric with the peripheral edge of said circular segment portion, a pair of supporting arms, a step comprising a tread secured to said arms, a stud at one end of each arm and received in an aperture of a corresponding bracket so as to pivotally secure the arm to the bracket, and a second stud constituting a fulcrum on each of said arms and intermediately spaced from said first-mentioned studs and said tread, said second studs arranged to selectively engage in said slots to position said tread in operative and inoperative positions, said second studs having enlarged heads and arranged to overhang the marginal edges of a respective circular segment portion and respective slots of said brackets to prevent lateral sway of said arms relative to said brackets.

2. The invention as defined in claim 1, wherein said second studs are spaced from said first-mentioned studs a distance slightly greater than the distance from said aperture to either of said slots, whereby said arms when caused to be moved radially outwardly effect disengagement of said second studs from either of said slots and when caused to be moved radially inwardly effect engagement of said second studs into either of said slots.

References Cited in the file of this patent

UNITED STATES PATENTS

| | | |
|---|---|---|
| 224,961 | Sims | Feb. 24, 1880 |
| 750,893 | Riggs | Feb. 2, 1904 |
| 868,352 | Marr | Oct. 15, 1907 |
| 1,762,052 | Dodds | June 3, 1930 |
| 2,604,335 | Hilfiker | July 22, 1952 |
| 2,653,036 | Creel | Sept. 22, 1953 |

FOREIGN PATENTS

| | | |
|---|---|---|
| 610,502 | Great Britain | Oct. 15, 1948 |